United States Patent [19]

Hawkins et al.

[11] Patent Number: 4,554,402
[45] Date of Patent: Nov. 19, 1985

[54] VIBRATION DAMPER FOR OVERHEAD CONDUCTOR

[75] Inventors: Ronald G. Hawkins, Massena; Robert M. Hooker, Brushton, both of N.Y.

[73] Assignee: Aluminum Company of America, Pittsburgh, Pa.

[21] Appl. No.: 718,549

[22] Filed: Apr. 1, 1985

Related U.S. Application Data

[63] Continuation-in-part of Ser. No. 565,180, Dec. 23, 1983, Pat. No. 4,527,008.

[51] Int. Cl.$^4$ .............................................. H02G 7/14
[52] U.S. Cl. ........................................ 174/42; 188/379
[58] Field of Search ................... 174/42; 188/378, 379

[56] References Cited

U.S. PATENT DOCUMENTS 2,271,935  2/1942  Buchanan et al. .................... 174/42
3,478,160  11/1969  Reed ..................................... 174/42

FOREIGN PATENT DOCUMENTS 567131  12/1958  Canada .................................. 174/42

Primary Examiner—Laramie E. Askin
Attorney, Agent, or Firm—Elroy Strickland

[57] ABSTRACT

A device for damping vibrations of an overhead conductor, the device including a member adapted to be clamped to the conductor. The member has a clamping portion for engaging the conductor and an arm portion extending from the clamping portion. Opposed sides of the arm portion have rounded depressions provided therein. Spherical elastomer damping elements have portions located respectively in the depressions, and an integrally formed rib that joins the spheres together in pairs. A weight member is disposed adjacent the opposed sides of the arm portion, the weight member having opposed depressions for holding portions of the damping elements that are opposite the portions located in the depressions of the arm portion.

3 Claims, 5 Drawing Figures

VIBRATION DAMPER FOR OVERHEAD CONDUCTOR

CROSS-REFERENCE TO RELATED APPLICATION

This is a continuation-in-part of U.S. Ser. No. 565,180 filed Dec. 23, 1983, now U.S. Pat. No. 4,525,008.

BACKGROUND OF THE INVENTION

The present invention relates generally to means for reducing and/or stopping vibration occurring on spans of overhead conductors, and more particularly to a relatively lightweight seismic damping device employing a fatigue resistant elastomer damping means.

Heretofore, the device that has been used extensively in damping the vibration of single overhead conductors has been the Stockbridge damper. As is well known, such a device employs a stranded steel cable supporting weights on opposed ends of the cable; the cable being connected to a conductor by way of clamping means. The Stockbridge damper uses friction among the strands of the cable to dissipate the energy of the wind received by the conductor in the form of heat. Three U.S. patents describing such dampers are U.S. Pat. Nos. 1,992,538 to Monroe et al, 2,058,173 to Noyes et al and 2,094,899 to MacIntyre.

A damping device employing two elastomer washers mounted between opposed inertial weights and a clamp arm is shown in U.S. Pat. No. 2,271,935 to Buchanan et al. The device is mounted on the conductor such that it extends horizontally from the conductor. The vertical motion of the conductor is converted to a twisting motion by the weights. Other motions of the weights appear to be precluded, as the elastomer washers are compressed into a space provided between the clamp arm and a bolt securing the weights to the arm.

U.S. Pat. No. 3,478,160 to Reed shows a damping device in which a weight is connected to a clamp arm via a single rubber bushing. The center of gravity of the weight is offset from the location of weight suspension, and the weight is asymmetrical about three mutually orthogonal planes, all passing through the center of gravity.

The washers and bushings of Buchanan et al and Reed function to dissipate the energy of conductor vibration by virtue of hysteresis losses in the elastomer material, as opposed to the sliding friction that takes place between adjacent metal strands of the Stockbridge damper.

BRIEF SUMMARY

The present invention is directed to a small, compact seismic damper having an elastomer damping mechanism that is resistant to the stresses it experiences on a vibrating conductor. Such a damper, in addition, when clamped to a conductor, lies close to the conductor so that it is electrically shielded by the conductor. In this manner, the damper of the invention does not create corona problems when used under high voltage conditions.

The compactness, as well as highly efficient damping, is provided by the use of small spherical or ball-shaped damping elements of solid elastomer material located between the arm of a structure for clamping to a conductor and a mass or weight means disposed on opposed sides of the arm. The spherical elements are joined together in pairs by a ring or rib of elastomer material that extends around the elements and is integrally formed with the elements such that the volume of the material is greater than the volume of material in the spheres alone. The increased volume allows the elastomer to experience conditions of working that would otherwise stress the spheres to the point that they would be damaged and thereby cease to function as an effective damping mechanism.

The positions of the mass and elastomer spheres relative to the clamping structure are such that the mass is provided with at least three degrees of freedom relative to the clamp arm when the conductor vibrates. This allows damping at a variety of frequencies of conductor motion, as aeolian vibration of a conductor occurs at different frequencies on different occasions because the frequency induced by the wind varies with the velocity of the wind.

The use of elastomer spheres as damping elements and rounded depressions in the clamp arm and weight in which the spheres are seated provides several additional advantages. For example, there are no stress concentrations on the spheres and the integral rib, as explained in detail hereinafter, that would reduce the fatique life thereof under both static and dynamic conditions. The spheres are easily retained in the depressions without the use of adhesives and the labor involved in applying adhesives. The shape of a sphere is also conducive to isotropic (all direction) motion as discussed above. In addition, a sphere is easy to assemble with other components as it does not require indexing or aligning with rounded, spherical seats.

THE DRAWINGS

The invention, along with its objectives and advantages, will be better understood after consideration of the following detailed description and accompanying drawings in which.

PREFERRED EMBODIMENT

Figure 1:
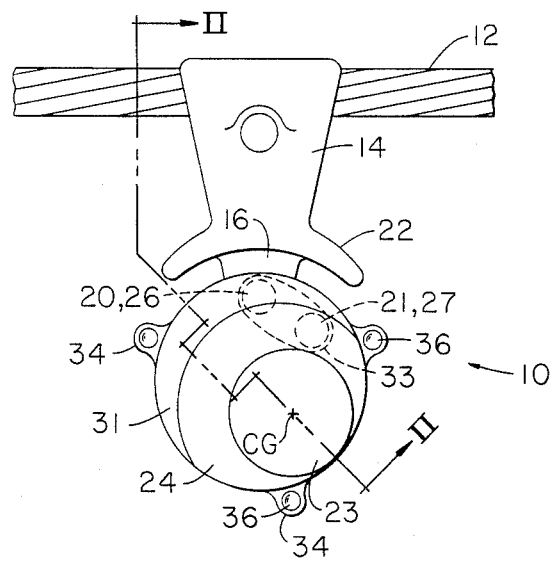
FIG. 1 is an end elevation view of the damping device of the invention.
Figure 4:
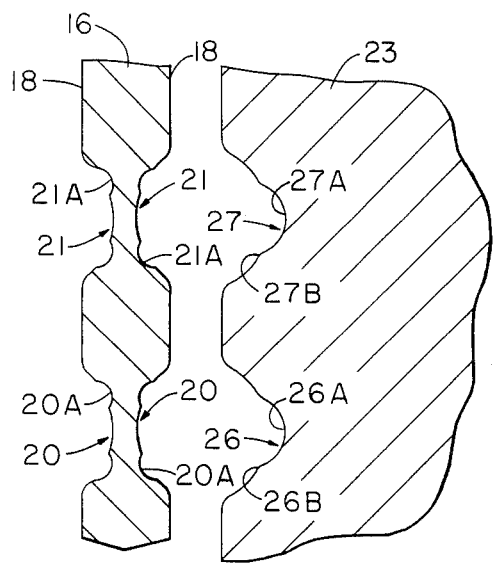
FIG. 4 shows in partial section a clamp arm and weight member of the damping device.

Referring now to the drawings, FIG. 1 thereof shows an end elevation view of the damper or damping device 10 of the invention mounted on a conductor 12 via a clamping member 14. The clamping member has an integral extension on arm 16 that extends downwardly from the upper clamping portion of the member. The lower end of the extension or arm provides opposed surface areas 18 (FIG. 4) sufficient to accommodate two, spaced apart, spherical depressions or sockets 20 and 21 on each surface. In FIG. 4 both sides of the clamp arm are visible so that the depressions on both sides are visible.

Clamp 14 is also provided with a curved, integral shield structure 22 for purposes explained hereinafter.

On opposed sides of the clamp extension, i.e., opposed surfaces 18, is located a weight or mass structure 23. Weight or mass 23 comprises two somewhat elongated, weight halves having rounded ends and conical flanges 24 located opposite the ends. The weight halves are provided with two spherical depressions 26 and 27 (FIG. 4) facing inwardly toward depressions 20 and 21 provided in clamp arm 16. When the weight halves are properly aligned, flange cones 24 are located in the positions shown in FIGS. 1 and 2 which locate the depressions 26 and 27 therein opposite to and in respective alignment with depressions 20 and 21 on both sides of the clamp arm. In FIG. 1, the aligned depressions are shown in dash outline; only two outlines are depicted, as the depressions in the clamp arm and weight halves are shown superposed.

As seen in FIG. 1, when the weight 23 is properly attached to clamp arm 16, the center of gravity CG of the weight is located a predetermined distance from the location of the depressions (and elastomer spheres discussed hereinafter). This distance provides a lever arm, the end of which contains the center of gravity of the weight.

When mounted on a conductor (12) by clamp 14, the orientation of the elongated weight 23 is crosswise of the axis of the conductor.

As seen in section in FIG. 4 of the drawings, each of the depressions in the weight halves 23 comprises in effect two concentric, intersecting, compound spherical sockets, the two sockets comprising a relatively large, outermost socket (26 and 27) and a small, innermost socket (26A and 27A). The intersecting sockets are provided with generous blend radii 26B and 27B extending between the two for purposes explained below.

The smaller sockets are preferably located in the weight halves 23, as the weight halves provide ample material for such purposes. In contrast thereto, the mass of clamp arm 16 is relatively small since its primary purpose is to suspend the weight halves from conductor 12.

However, the smaller of the sockets need not necessarily be located in the bottom portions of the larger of the sockets, nor be limited to the weight halves. For example, each larger socket can be provided with a rounded (in cross section) depression 20A and 21A, as shown provided in arm 16, in FIG. 4. Such depressions might be located midway between the uppermost and lowermost surfaces of the larger sockets such that depressions 20A and 21A would be annular or ring-like sockets located in the larger sockets. A blend radius between the sockets would be similar to the blend radii 26B and 27B between sockets 26 and 26A and 27 and 27A.

Each of the weight halves 23 has a peripheral wall portion 28 that provides an enclosed space or chamber 30 between the two weight halves when placed together about clamp arm 16. The upper portions of walls 28 (FIG. 2) are located above conical sections 24 of the weight halves so that space 30 is extended somewhat in the direction of conductor clamp 14. The upper wall portions complete the enclosure of 30 by the joining conical sections 24 via vertical walls 31.

Figure 2:
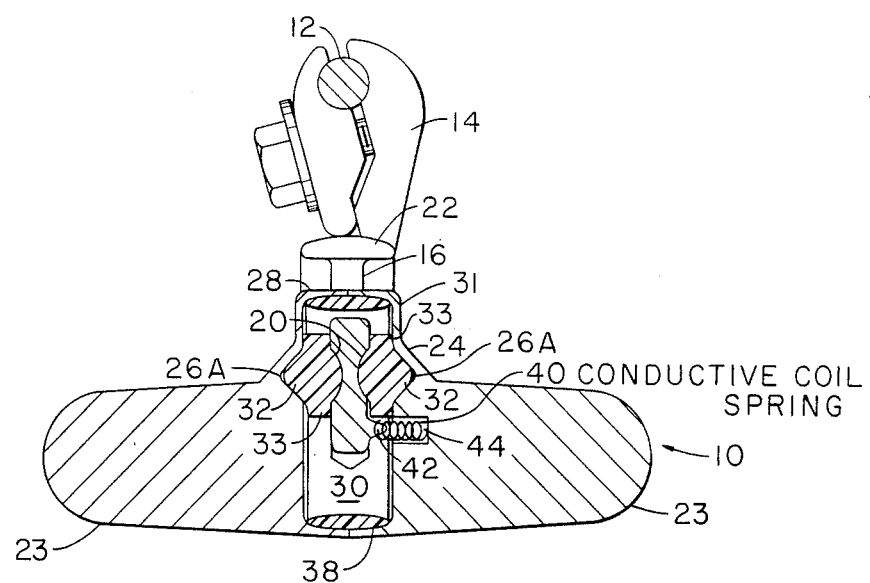
FIG. 2 is a sectional view of the damping device of FIG. 1 taken along lines II—II in FIG. 1.
Figure 3:
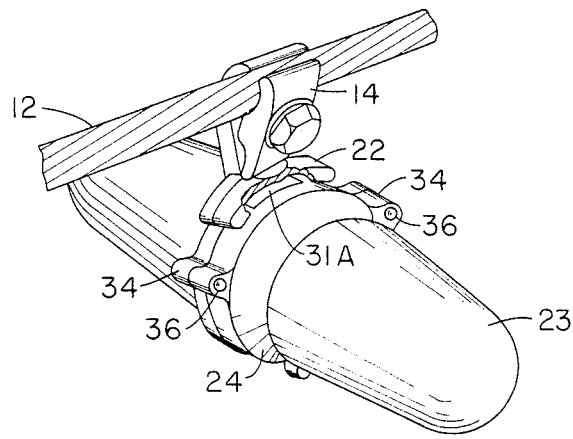
FIG. 3 is a perspective view of the damping device of the invention shown attached to a stranded conductor.

An opening 31A (visible in FIG. 3) is provided in the upper walls of 28 of the weight halves to allow the arm 16 of the conductor clamp to extend into space 30, as seen in FIG. 2.

Figure 5:
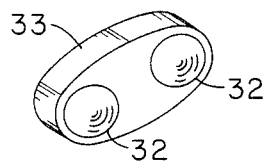
FIG. 5 is a perspective view of an elastomer damping structure employed in the invention.

Space 30 accommodates the lower part of clamp arm 16 and four spherical elastomer damping elements 32 located between the weight halves and clamp arm and in the respective sockets or depressions 20, 21, 26, and 27 provided in the weights and arm. Hence, a pair of spheres are located on each side of arm 16. The two spheres that comprise the sphere pair on each side of arm 16 are integral structures joined together by an integral ring or rib 33, as best seen in FIG. 5, that extends around the spheres in a plane that is parallel to the plane of the arm when the damper is assembled. These ribs are also shown in cross section in FIG. 2 of the drawings, and in dash outline in FIG. 1. Only two of the spheres, however, are visible in FIG. 2.

The four spherical elements support and suspend the weight halves on the clamp arm when the device 10 is attached to an overhead conductor. A preferable material for the spheres is a pure (i.e., no additives) silicone gum.

Under extreme conditions of vibration (and oscillation and galloping,) of an overhead conductor, an elastomer material is severely worked such that the material can be fatigued and damaged to the extent that it ceases to function as a mechanism for damping. By adding, however, an integral rib 33 of elastomer material, the pair of spheres and rib work together to dampen vibration without being unduly stressed and fatigued.

Each weight half 23 is provided with integral outwardly projecting ears or tabs 34 (FIGS. 1 and 3) that are employed to secure the halves together. Each ear can be provided with an opening through which a rivet 36 (FIG. 1) is inserted therethrough and secured. However, a preferable method of securing the weight halves together is to provide the ears 34 of one weight half with integral rivets (the ends of which are visible in FIGS. 1 and 3 and labeled 36 therein) and the ears of the other half with suitable openings. The integral rivets extend toward the other weight half and ears as the weight halves are brought together and proceed through the openings provided in the other ears. If the weight halves are castings, the ears and rivets are provided in the casting process.

Within the chamber 30 (formed by the weight halves) is located an elastomer strip and bumper 38, as shown in section in FIG. 2. As shown, the bumper is located against the inside surface of walls 28 of the weight 23. Bumper 38 is preferably constructed of a one-piece, relatively hard elastomer material that retains its shape. The ends of the bumper preferably extend through opening 31A to act as a means to cushion impacts between clamp arm 16 and the edges of wall portions 28 of the weight halves.

An open coil spring 40 is shown in FIG. 2 that maintains clamp 14 and weight 23 at the same electrical potential. A conical protrusion 42 is provided on one surface 18 of the clamp arm, and a recess 44 is provided in the weight half facing the protrusion to center and receive the spring when damping device 10 is assembled.

The device 10 is assembled by placing spring 40 in recess 44 provided in the one weight half and the elastomer spheres 32 seated in the depressions 20 and 21 provided in the clamp arm; the weight halves are then brought together about the clamp arm and spheres. The depressions 26 and 27 in the weight halves align with the spheres, and protrusion 42 with spring 40, when the upper wall portions 28 of the weight halves are disposed about the clamp arm. Also, the ears 34 of one weight half align with the ears of the other weight half when wall portions 28 thereof are disposed around the clamp arm; rivets 36 of the one weight half enter the openings provided in the ears of the other weight half, as explained earlier when the halves are brought together.

The components are then secured together by the rivets.

The elastomer spheres and integral ribs are now secured between the clamp arm and weight halves. The size of the spheres and the depths of the sockets or depressions are such that when the weight halves are secured together by rivets 36, the spheres are compressed and the weight halves and clamp arm are spaced apart by the distance of the compressed spheres. The larger socket provides a firm grip and a proper bearing surface for the elastomer of the sphere, while the small, inner sockets 26A and 27A (in weight halves 23) and/or annular sockets 20A and 21A provided in arm 16 provide a place and space for the material of the elastomer to flow and accumulate when commercial tolerances require such. In this manner, a proper amount of compression on spheres 32 is provided such that the spring constant of the spheres and ribs 33 is maintained at a proper value to provide efficient damping by device 10.

For example, if spheres 32 are undercompressed, the result is a reduction in their outside diameters and a spring constant that is too soft such that the spheres do not provide a maximum damping capability. Over compression, on the other hand, makes the spheres too stiff such that damping efficiency is again reduced. Spheres 32 and ribs 33 suppress conductor vibration by absorbing and dissipating, by hysteresis losses in the form of heat, the energy of vibration at a rate greater than that at which the wind can supply energy to replace the dissipated energy.

As indicated earlier, there are generous blend radii provided between the outer and inner sockets of the weight halves and clamp arm. Such radii allow the material of the elastomer spheres 32 to flow into the smaller sockets while at the same time providing a smooth surface that does not present stress edges that would result in eventual fatigue of the spheres.

The right and left hand weight halves of the invention, with the wall portions 28, completely enclose the elastomer spheres and ribs and thereby protect the same from the degrading effects of ultraviolet radiation (from the sun) on the material of the spheres. Bumper strip 38 located inside space 30 also serves to keep sunlight from the interior of the space. And, adding further to the protection of the spheres and ribs is the integral curved shield 22 of the clamp. Shield 22 covers opening 31A in wall portions 28 through which the clamp arm extends.

Preferably, the material of the clamp arm 14 is light in weight in comparison to the material of the weight 23. A suitable material for the clamp arm is a strong aluminum alloy, while the material of the weight may be a much heavier material, such as zinc; both materials are easily die cast, though the invention is not limited thereto.

While the invention has been described in terms of preferred embodiments, the claims appended hereto are intended to encompass all embodiments which fall within the spirit of the invention.

What is claimed is:

1. A device for damping vibrations of an overhead conductor, comprising:
   a member for clamping on the conductor,
   a weight member attached to said clamping member,
   opposed depressions provided in the clamping and weight members, with the depressions in at least said weight member each comprising a relatively small spherical socket that intersects a larger spherical socket at a location intermediate the inner and the outermost portions of the larger socket,
   spherical damping elements made of elastomer material located in the depressions and secured between the weight and clamping members, with a pair of said elements being joined together by a rib structure integrally formed with said pair of elements.

2. The damping device of claim 1 in which the depressions provided in the clamping member each comprise a relatively small spherical socket intersecting a relatively larger spherical socket at a location intermediate the inner and outermost portions of the larger socket.

3. The damping device of claim 1 in which the depressions in the weight and/or clamping member are each provided with a relatively small socket intersecting a relatively large socket in a manner that provides the larger socket with an annular shaped smaller socket.

* * * * *